Oct. 16, 1923.
T. BROWN
MOTOR CULTIVATOR
Filed June 15, 1920
1,471,138
3 Sheets-Sheet 2
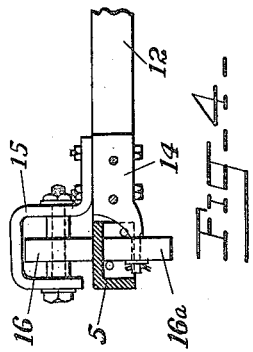
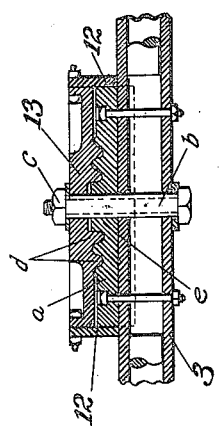
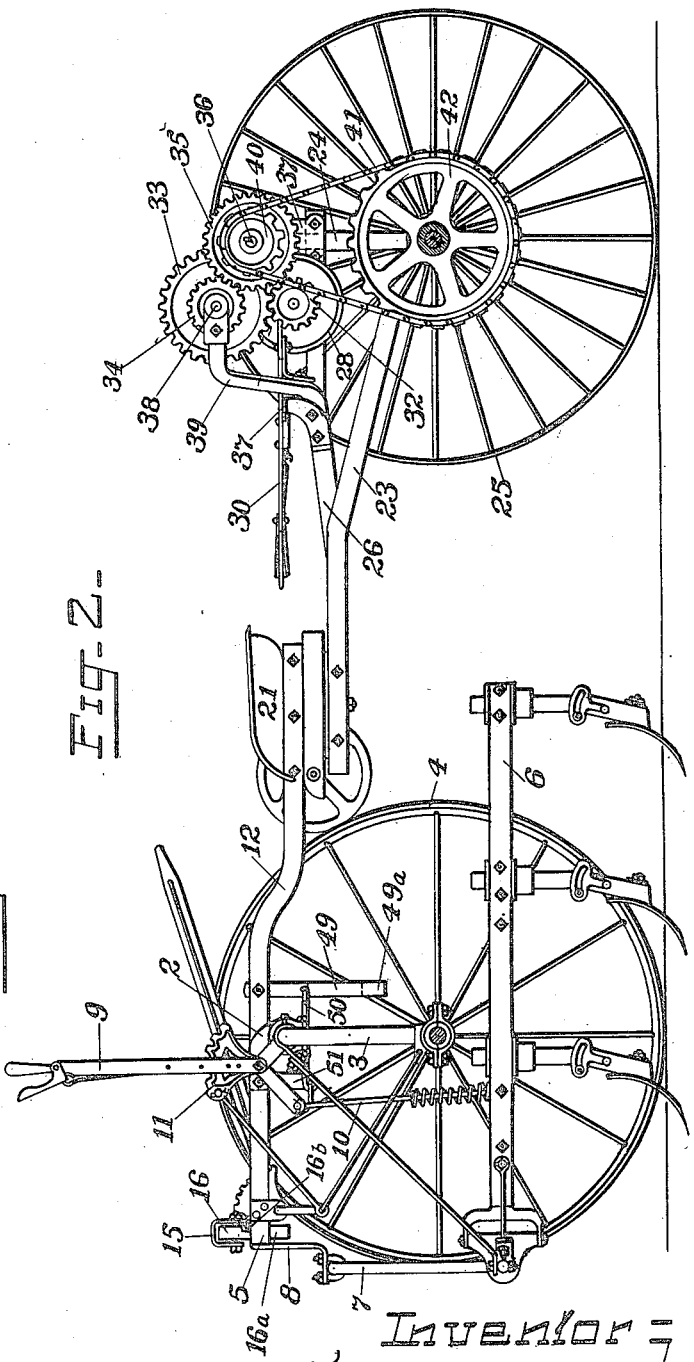
Witness:
E. Wilderson
Inventor:
Theophilus Brown
By H. H. Bliss
Attorney

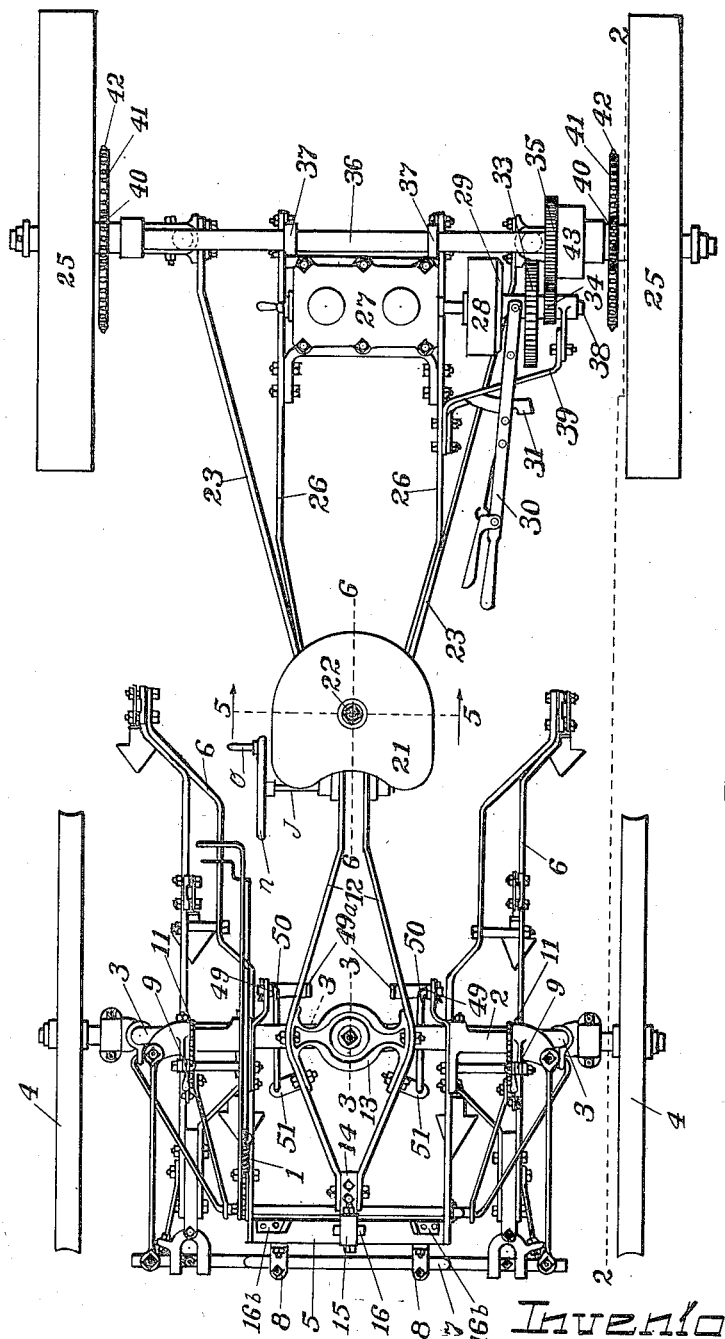

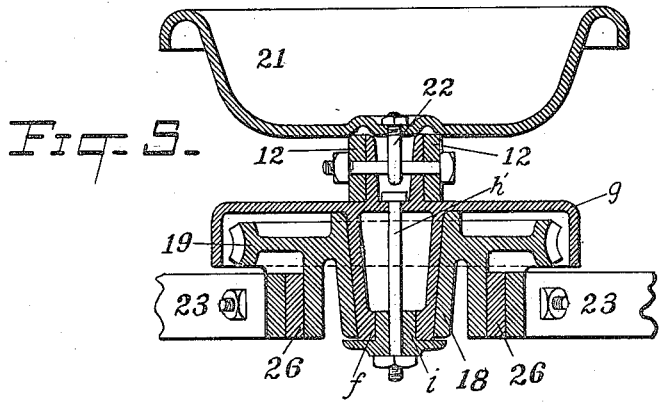
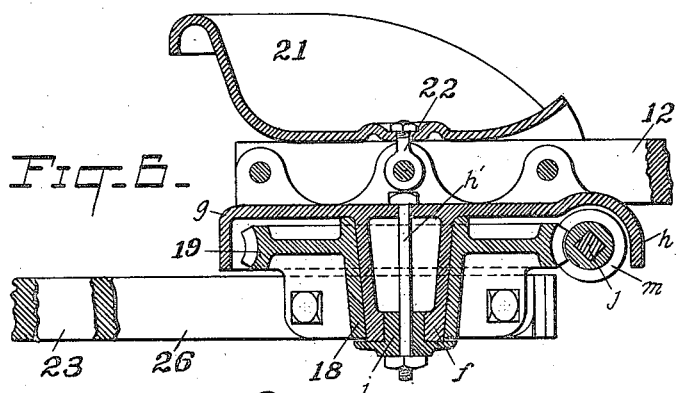
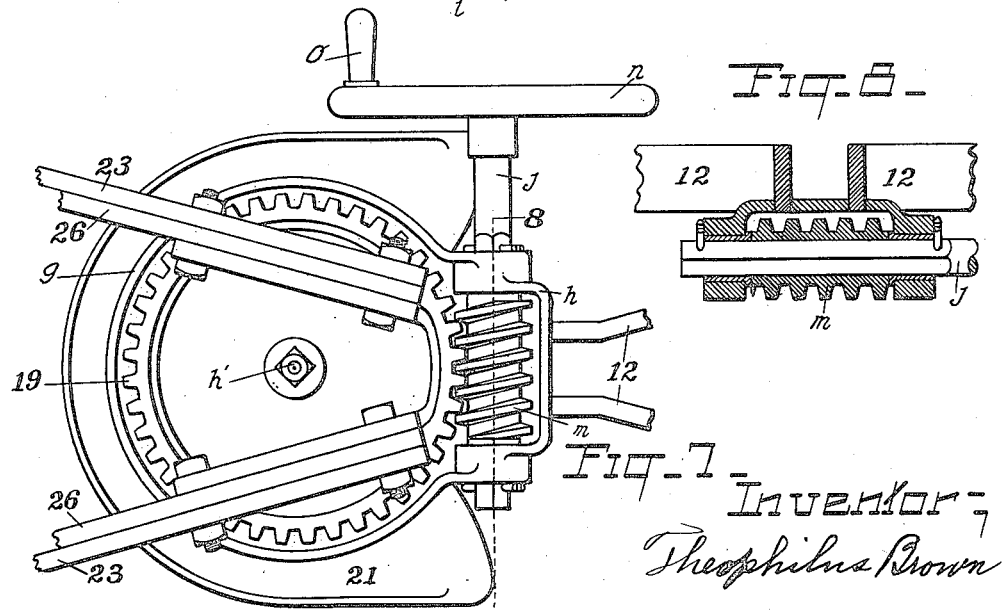

Patented Oct. 16, 1923.

1,471,138

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

MOTOR CULTIVATOR.

Original application filed March 23, 1917, Serial No. 156,995. Divided and this application filed June 15, 1920. Serial No. 389,063.

*To all whom it may concern:*

Be it known that I, THEOPHILUS BROWN, a citizen of the United States, residing at Moline, in the county of Rock Island and State of Illinois, have invented certain new and useful Improvements in Motor Cultivators, of which the following is a specification, reference being had therein to the accompanying drawing.

My invention relates to improvements in tractors employed in propelling tillage implements more particularly of the cultivator class,—this application being a division of application for patent filed March 23, 1917, and designated by Serial Number 156,995, Patent No. 1,411,476, Apr. 4, 1922.

An object of my invention is to connect the tractor and cultivator in such a manner that the latter is quickly responsive to the actuation of the means employed to cause it to deviate from a straight line of advance in order to avoid obstruction or to provide proper tillage for rows of irregularly positioned plants as will be clearly defined in the following specification. In the type of cultivator shown and described the wheels and axle move together when turning the implement to deviate from a straight line, as distinguished from cultivators in which the wheels are dirigible.

Referring to the drawings in which similar numerals indicate identical parts—

Figure 1 is a plan view of a motor propelled cultivator embodying my improvements.

Figure 2 is a side elevation in section on the line 2—2 of Figure 1.

Figure 3 is a detail section on the line 3—3 of Figure 1.

Figure 4 is a detail view of the forward end support of the tractor frame.

Figure 5 is an enlarged vertical longitudinal section on the line 5—5 of Figure 1.

Figure 6 is an enlarged vertical longitudinal section on the line 6—6 of Figure 1.

Figure 7 is an enlarged bottom view of the joining devices for the frame sections and the adjusting means.

Figure 8 is a section on the line 8—8 Figure 7.

The frame of the cultivator consists of bars 1 secured to brackets 2 mounted on an arched axle 3. The arched axle has laterally projecting ends upon which are mounted supporting wheels 4. The forward ends of the frame bars 1 are connected to a transverse bar 5 and their rear ends extend beyond the brackets 2. Gangs 6 of cultivating devices are coupled to an arch 7 and can be any one of various types well known in the art.

Levers 9, one for each gang, are pivotally mounted on the brackets 2, their lower ends extending forwardly of their pivots and connected to the gangs 6 by links 10, so that by operation of the levers 9 either of the gangs 6 can be raised or lowered, as desired, and held in position by the usual type of latch on the levers 9 engaging with notches on segments 11 secured on the brackets 2.

The tractor frame is in two sections pivotally joined substantially midway of its length. the forward section forming an intermediate frame between the cultivator frame and the rear section, and comprising bars 12 which diverge to a member 13, to which they are secured. Attached to the axle 3, by suitable bolts, is a circular plate $a$ upon which the member 13 rests and rotates about a pivot bolt $b$, which passes through the axle 3, the plate $a$ and the member 13, holding these parts together by a nut $c$ on the end of the bolt; the member 13 is provided, on its under surface with ribs $d$, concentric with the pivot $b$, which move, when the member 13 is swung, in grooves $e$ on the upper surface of the plate $a$. From the member 13 the bars 12 converge forwardly to a block 14 to which they are rigidly connected. Rigidly mounted on the block 14 I provide an inverted U-shaped bearing 15 carrying a roller 16 which travels over the surface of the bar 5, its range of lateral movement being limited by steps $16^b$ secured on the bar 5, a similar roller $16^a$ is mounted on a forward extension of the block 14 and is adapted to rotate against the under surface of the bar 5; by this construction the forward end of the tractor frame is suitably supported to relieve the pivot bolt $b$ from lateral strain. The bars 12 also converge rearwardly from the member 13 to the pivotal connection of the two sections.

The rear section of the tractor frame comprises bars 23 the rear ends of which are connected to the vertical portions of an arched axle 24, the latter having mounted thereon tractor wheels 25. Bars 26 are connected to suitable brackets on the arched axle 24 and converge forwardly to the connection of the tractor frame sections. A motor 27 is supported preferably on the bars 26, and has a fly-wheel, carrying or formed as one element of a friction clutch at 28. The companion element 29 of the clutch is controlled by a hand lever 30 which is locked in any desired position by a thumb latch detent, and notched segment 31.

A pinion 32 is mounted on the motor shaft and is actuated thereby when the clutch is closed. The pinion 32 meshes with a gear 33 on a shaft above the motor shaft; the gear 33 or its shaft carrier a pinion 34 which meshes with a gear 35 on a cross shaft 36 mounted in bearings 37 secured to the upper part of the arched axle 24. The counter shaft 38 and the wheels thereon are supported by a bracket 39 connected to one of the frame bars 26.

Sprocket wheels 40 are mounted on the cross shaft 36 and are connected by a chain 41 with sprocket wheels 42 on the traction wheels 25. A differential gearing 43, of any desired type, is interposed between the pinion 54 and the sprocket wheels 40 and is mounted on the shaft 36 so that the power transmitted to the gear 35 will be imparted equally to the traction wheels, but with differential speeds, according to circumstances.

The pivotal connection of the two sections of the tractor frame comprises the following elements. 18 indicates a tubular, preferably conical, socket which is secured to the forward ends of the bars 26, as shown in Figures 6, 7 and 8. 19 is a worm gear integral with, or secured to, this socket 18. A stub shaft or large stem $f$ fits in the socket 18 and is rigid with the bars 12 and the front frame section. As shown, it is cast with a plate $g$ which has upwardly projecting ears for bolting it to the bars 12. The plate $g$ can be formed, as shown, with a depending flange $h$ to provide a projecting cover for the work gear. The shaft or stem $f$ is held snugly in journaled position in the socket 18 by means of a bolt $h'$, the head of which engages with the plate $g$; the bolt having a nut at the lower end engaging with a washer cap $i$ of sufficient width to engage with the lower end of the socket 18. On a horizontal shaft $j$, mounted in bearings $k$ which are shown as formed in the plate cover $l$, is a worm $m$. This worm $m$ being mounted on the front frame section, and the two sections being hinged together or pivotally connected, it will be seen that the front frame section and the rear section can be readily and quickly thrown to one or another of various lateral inclinations, as desired. To effect this, the worm $m$ is turned by means of a hand wheel $n$ secured to the worm shaft $j$, the wheel preferably having a convenient handle $e$. The operator is provided with a seat 21 adjacent the hinge axis and the hand wheel $n$.

Pivotally mounted on the rear end of each of the frame bars 1 of the cultivator are foot levers 49 which are connected to the opposite sides of the forward section of the tractor frame by links 50, the latter engaging with the foot levers 49 between the pivotal points of the latter and the foot rests 49$^a$ and with brackets 51 secured to the bars 12 forward of the pivotal axis of the section of which they are a part.

Assuming that the implement is in use cultivating plants growing in rows, the operator having started the motor and thrown in the clutch by operating the lever 30, and having his feet resting on the foot levers 49, the implement moves forward by power transmitted from the motor to the tractor wheels 25, the direction of its progress being controlled by actuation of the foot levers, even pressure upon the latter preventing deviation from a straight line of advance. If, however, there is presented irregularity in the rows which requires a deviation from a straight line as for instance to the right, proper pressure upon the right foot lever will cause the axle 3 to swing on the pivot bolt $b$ causing the wheels 4 and the cultivating mechanism to travel in the desired direction, the turning movement being accelerated by the propelling force of the tractor; to cultivate along irregular rows however requires but a slight deviation from a straight line which is readily served by a proper actuation of the foot levers to turn to the right or left as the case might be. In either case he automatically loads the rear ground wheels or traction devices in the direction to be traveled.

In making a turn however, at the end of a row, actuation of the foot lever on the side toward the direction the turn is to be made will be continued to a greater degree than when a deviation from a straight line is made for irregularities in rows of plants. When it becomes necessary to turn the machine completely around, as, for instance, when the end of a row of plants has been reached, and to travel in the opposite direction, the operator inclines the front frame section to the rear section by turning the hand wheel $n$ in the proper direction, causing the worm $m$ and the worm gear 19 to bring the frame sections to an angle with each other toward the right or left, as desired, and causing the axis of the wheels under the front section to assume a position inclined to the axis of the wheels of the rear section; and by angulating the two frame sections with each other to a considerable extent, he can turn the implement on curves of short radii.

The extent to which he can, by the steering treadles, angulate the front wheels is limited; but if he supplements this by actuation of the power devices at 19 and m, he can shorten the radius of the curves on which the front end of the machine turns.

When the machine has been brought around toward the position for traveling in the opposite direction, the hand wheel and worm are reversed, and the front and rear frame sections are again brought into alinement and their parts are again ready to be steered and manipulated through the foot lever.

As ready stated, I have presented in detail, in this particular sub-class as one exhibiting all the advantages incident to my invention. But as concerns the particular work to be accomplished, or the details of structure, there can be modifications without departing from the essential features of my invention.

What I claim is—

1. A tractor-pushed tillage implement, comprising a front frame, wheels supporting said frame, tilling devices connected with said frame, a rear frame, one or more power-driven wheels supporting said rear frame, and an intermediate frame connecting said front and rear frames and angularly adjustable with reference to each of said frames.

2. A tractor-pushed tillage implement, comprising a front frame, wheels supporting said frame, tilling devices connected with said frame, a rear frame, one or more power-driven wheels supporting said rear frame, an intermediate frame connecting said front and rear frames and angularly adjustable with reference to each of said frames, and means for normally holding said intermediate frame in fixed position relatively to said rear frame.

3. A tractor-pushed tillage implement, comprising a front frame, wheels supporting said frame, tilling devices connected with said frame, a rear frame, one or more power-driven wheels supporting said rear frame, an intermediate frame connecting said front and rear frames, and angularly adjustable with reference to each of said frames, and means for angularly adjusting said intermediate frame relatively to said rear frame.

4. A tractor-pushed tillage implement, comprising a front frame, wheels supporting said frame, tilling devices connected with said frame, a rear frame, one or more power-driven wheels supporting said rear frame, an intermediate frame connecting said front and rear frames and angularly adjustable with reference to each of said frames, means for angularly adjusting said intermediate frame relatively to said rear frame, and means for angularly adjusting said front frame relatively to said intermediate frame.

5. A tractor-pushed tillage implement, comprising a front frame, wheels supporting said frame, tilling devices connected with said frame, a rear frame, one or more power-driven wheels supporting said rear frame, an intermediate frame connecting said front and rear frames and angularly adjustable with reference to each of said frames, and levers for adjusting said front frame angularly relatively to said intermediate frame.

THEOPHILUS BROWN.